Sept. 29, 1964 J. J. GRABAUSKAS 3,150,862
APPARATUS FOR MIXING VISCOUS LIQUIDS
Filed Oct. 16, 1959 3 Sheets-Sheet 1

INVENTOR.
JOSEPH J. GRABAUSKAS
BY
*[signature]*
ATTORNEY

Sept. 29, 1964   J. J. GRABAUSKAS   3,150,862
APPARATUS FOR MIXING VISCOUS LIQUIDS
Filed Oct. 16, 1959   3 Sheets-Sheet 3

INVENTOR.
JOSEPH J. GRABAUSKAS
BY
Elmer J. Fischer
ATTORNEY

United States Patent Office 3,150,862
Patented Sept. 29, 1964

3,150,862
APPARATUS FOR MIXING VISCOUS LIQUIDS
Joseph J. Grabauskas, Chicago, Ill., assignor to Union
Carbide Corporation, a corporation of New York
Filed Oct. 16, 1959, Ser. No. 846,868
4 Claims. (Cl. 259—9)

This invention relates to the mixing or homogenizing of viscous liquids and more particularly to the mixing of continuous streams of viscous liquids with fluid coloring matter such as a pigment dispersion in a liquid medium. The invention additionally relates to apparatus for continuously blending metered streams of viscous liquids and liquid pigment dispersions to quickly form a homogeneous dispersion of pigment matter in the viscous liquid.

Although numerous types of mixing apparatus are known for dispersing pigment matter in a viscous liquid, such types of apparatus as exemplified by ball or pebble mills are characterized by a relatively slow mixing action requiring several hours or more to obtain a homogeneous mixture, and moreover, are primarily suited for batch operations rather than for mixing continuous streams of liquid materials. Other apparatus such as differential rolls, while somewhat faster in their mixing action and adaptable to accept a continuous supply feed of viscous liquids, are of open construction, exposing the liquid to atmospheric contamination, evaporation, oxidation, and other undesirable effects.

In the preparation of some physically or chemically active pigment-viscous liquid systems, rapid dispersion of a liquid pigment dispersion in a suitable liquid medium is essential in order to obtain a processable useful homogeneous mixture before undesirable and unwanted changes occur, as for example, gelation of the liquid medium because of its inherent properties or of its reactivity with alkaline or acidic pigment matter, or agglomeration of pigment particles which can be caused by the presence of electrolytes in the liquid medium.

Illustrative of this mixing problem is the pigmentation of viscose solutions which are subsequently processed to form pigmented regenerated cellulose fibers, films, and the like. Gelation of the viscose solution prior to the desired regeneration can occur whenever the mixing operation is unduly prolonged and especially if the mixing operation causes heating of the viscose. Agglomeration of dispersed pigment in the viscose solutions is frequently encountered with specific pigments sensitive to a strong electrolyte (e.g., sodium hydroxide) conventionally present in viscose solutions, and when the specific mixing operation employed is so time consuming that agglomeration finally occurs from prolonged contact with the electrolyte.

Accordingly, it is an object of this invention to provide means for continuously rapidly mixing together a liquid medium and a liquid pigment dispersion to form a homogeneous mixture, practically free of pigment agglomerates.

A further object is to provide means effective for mixing together a liquid medium susceptible to gelation upon heating or aging with a liquid pigment dispersion to form a useful homogeneous mixture at a rate rapid enough to avoid gelation.

Another object is to provide in a continuous viscose regenerating process means effective to continuously supply to the viscose extrusion apparatus a homogeneous mixture of viscose and liquid pigment dispersion substantially free of pigment agglomerates and gelled viscose.

Other objects will become apparent hereinafter.

In accordance now with the present invention, a liquid medium such as a highly viscous viscose solution is homogeneously and rapidly mixed in a continuous operation with a liquid pigment dispersion by forming a rotating mixture of liquid medium and liquid pigment dispersion divided into individual, spaced longitudinal sectorial portions, pressure feeding a stream of liquid medium and a stream of liquid pigment dispersion periodically into the periphery of each portion while concurrently interiorly shearing the mixture in each section portion, exteriorly shearing the mixture along the periphery of each portion, and discharging a stream of the sheared mixture from the periphery of each sector portion at a point longitudinally removed from the incoming pressure fed streams of liquid medium and liquid pigment dispersion.

Figure 1:
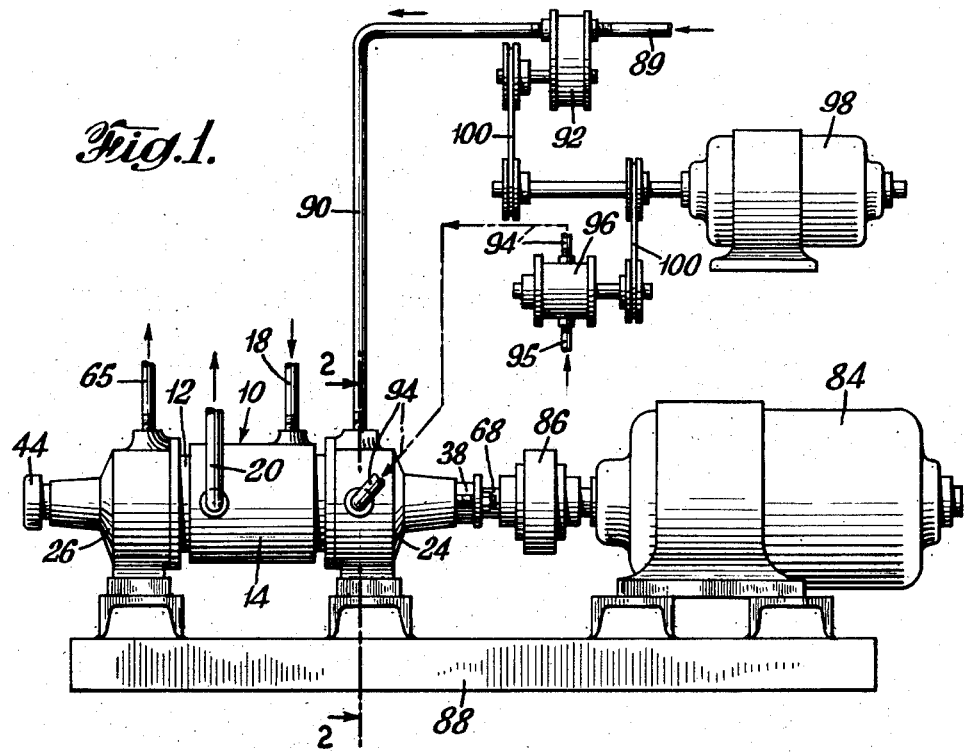
FIG. 1 is a side elevation of a mixing apparatus embodying the principles of this invention.
Figure 2:
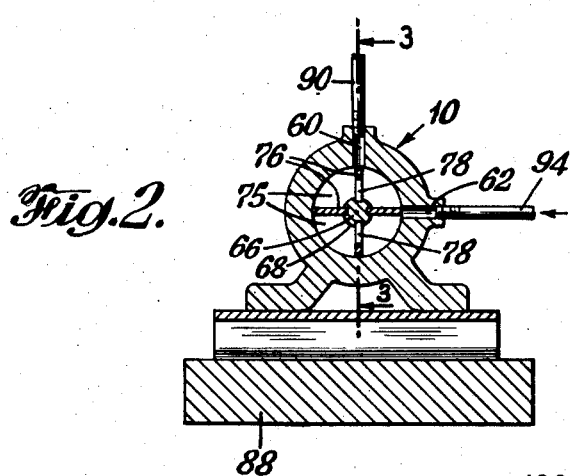
FIG. 2 is a sectional view of FIG. 1 taken along the lines 2—2.
Figure 3:
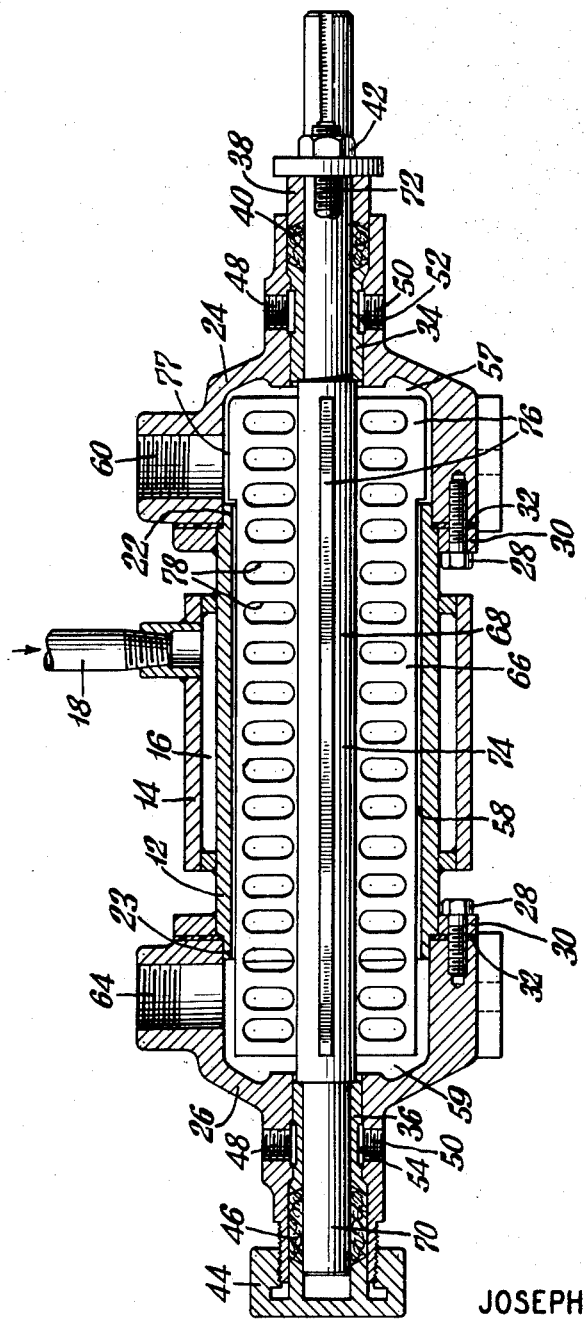
FIG. 3 is a sectional view of FIG. 2 taken along lines 3—3.

Referring now to the drawings, wherein like reference numerals designate like parts, the reference numeral 10 designates the mixer which includes a cylindrical metal shell 12. Welded to the outer periphery of the shell 12 is an annular water jacket 14 forming an annular channel 16 therebetween. Connected to the channel 16 at spaced points therealong are conduits 18 and 20 for supplying and exhausting, respectively, a cooling medium thereto and therefrom.

At each end of shell 12 are reduced ends 22 and 23 for engagement with end caps 24 and 26, respectively. Such caps 24 and 26 are secured to the shell 12 by bolts 28, only two of which are shown, spaced about and extending through annular flanges 30 welded to the shell 12 adjacent the ends 22, 23. Interposed between the flanges 30 and the caps 24 and 26 are annular seals 32.

Bearings 34 and 36 are housed in caps 24 and 26, respectively. The bearing 34 is maintained in shouldered relationship with the cap 24 by a packing gland 38 which exerts pressure on the packing 40. The gland 38 is adjustably fastened to the cap 24 by bolts 42, only one of which is shown. Similarly to maintain the bearing 36 in shouldered relationship with the end cap 26 a packing screw cap 44 threaded onto the end cap 26 exerts pressure on a packing 46.

Radially extending through each of the end caps 24 and 26 are ports 48 and 50 which supply and exhaust, respectively, a coolant such as water, to and from annular grooves 52 and 54 in the bearings 34 and 36, respectively.

The shell 12 along with the end caps 24 and 26 form a mixing chamber 58 of relatively low volume and thus provides quick mixing of the contents therein. The end caps 24 and 26 form, respectively, an enlarged inlet mixing compartment 57 and an enlarged outlet mixing compartment 59. Radially extending through the inlet end cap 24 are a pair of inlet ports 60 and 62 for separately supplying the liquids to the compartment 57. The ports 60 and 62 are in the same cross-sectional plane and spaced about 90° apart with the port 60 being vertically up and the port 62 being horizontal. Vertically extending through the uppermost portion of the outlet end cap 26 is a radial port 64 for discharging the homogenized mixture from the compartment 59, to a discharge conduit 65.

A rotor 66 for mixing the incoming liquids is housed in the chamber 58. Such rotor 66 includes a shaft 68 which extends through and is coaxial with the chamber 58. To maintain such a position reduced terminal portion 70 and 72 of the shaft 68 extend through the bearings 34 and 36 with the enlarged portion 74 of the shaft 68 being shouldered therebetween.

Longitudinally welded to the shaft 68 along the length thereof are a plurality of flat blades 76; each of which extends therealong and radially projects therefrom with longitudinal sectorial compartments 75 being formed between adjacent blades 76. The peripheral edge of each blade 76 is closely adjacent the inner peripheries of the shell 12 and inlet cap 24, thereby forming a close clearance therebetween. To compensate for the larger inner periphery of the inlet cap 24, each blade 76 has a shearing edge 77 projecting therefrom.

Figure 4:
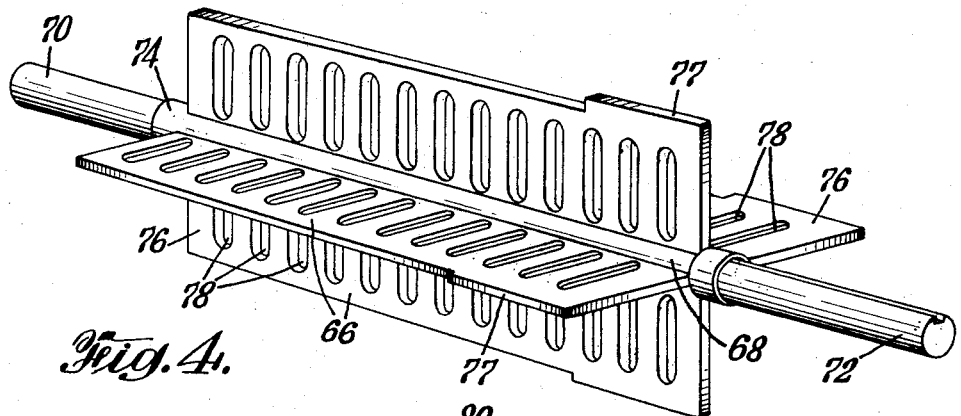
FIG. 4 is a perspective detail view of a slotted mixing rotor.

Uniformly spaced apart in each blade 76 are slots 78 forming connecting passages between the sectorial compartments 75. For optimum mixing the slots 78 in each blade are in staggered relation to the slots of adjacent blades 76 as shown in FIG. 4. Preferably the slots 78 are perpendicular to the axis of shaft 68 and extend substantially the width of blades 76. Such slots preferably have parallel sides and arc shaped ends.

Figure 5:
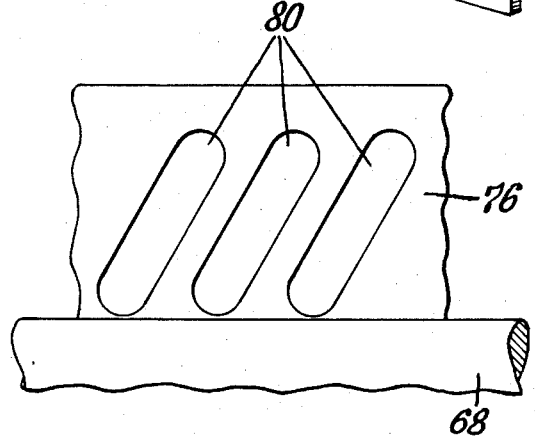
FIG. 5 and FIG. 6 are side elevations showing portions of alternate slotted embodiments of the rotor shown in FIG. 4.
Figure 6:
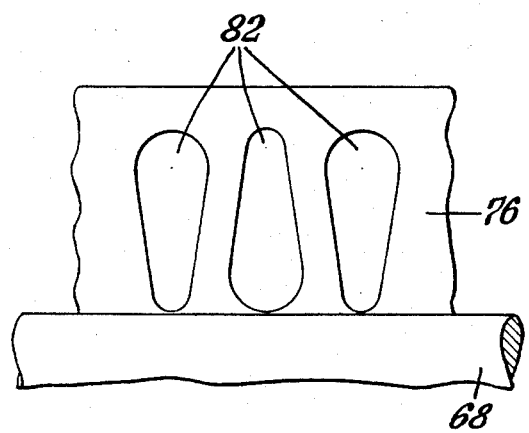

An alternate embodiment of the slots is shown in FIG. 5. Specifically slots 80 are arranged at an angle to the axis of the shaft 68 with such angle measuring from about 60 to 80°. Another alternate embodiment is shown in FIG. 6 in which the slots 82 have a petal shaped conformation. In such embodiment each slot 82 has converging sides with arc shaped ends of different radii. Desirably such different ends are alternately placed along the shaft 68.

The rotor 66 is rotated by a motor 84 connected to the shaft 68 by a coupling 86. A common base plate 88 supports the motor 84 and the mixer 10.

Preferably the liquids to be mixed in the mixer 10 are supplied thereto in metered or proportioned amounts. Suitably there is provided a metering pump 92 connected to a liquid supply conduit 89. Metering pump 92 discharges metered quantities of liquid into conduit 90 which is connected to inlet port 60. Similarly inlet port 62 is provided with metered quantities of liquid by metering pump 96 connected to conduit 94 and supply conduit 95. Both pumps 92 and 96 are driven by a variable speed motor suitably connected thereto, such as by chain drives 100.

In the preparation of a homogeneous mixture of viscose and liquid pigment dispersion, viscose is continuously fed under pressure, from a suitable source not shown, through pump 92, and then to the chamber compartment 57 via conduit 90 and the inlet port 60. Simultaneously, a liquid pigment dispersion is continuously fed under pressure from a suitable source, not shown, through pump 96, and then to the chamber compartment 57, via the conduit 94 and the inlet port 62.

As the blades rotate, the entering separate and spaced radial streams of viscose and liquid pigment dispersion flow into the longitudinal sectorial compartments 75. For pigmenting a viscose solution, the clearance formed between the chamber periphery and shearing edges 77 of the rotating blades 76 is from about 0.010 to 0.035 inch and the blade or rotor speed is from about 300 to 1200 r.p.m. for rotors having diameters between about 3 inches and 8 inches. Thus with a rotor having four blades each shearing edge 77 sweeps closely across each inlet port 60 and 62 from about 5 to 20 times per second. With this high velocity and close fit the edges 77 rapidly shear the entering individual streams of liquid into layers and quickly spread the sheared layers of viscose and liquid pigment dispersion into each other.

Concurrently, with the peripheral shearing and spreading action, the viscose and the liquid pigment dispersion periodically flows into each compartment 75 as it passes the inlet ports 60 and 62. The heterogeneous mixture is rotated and passes through the slots 78 in the blades 76. Accordingly, such mixture spirals through the mixing chamber 58 with the slots 78 shearing and mixing the spiralling mixture as it passes therethrough. Such shearing action of the slots 78 is increased by the staggered relationship of the slots 78 adjacent blades 76. Shearing of the spiralling mixture also occurs along the inner periphery of the shell 12 due to the close clearance between the blades 76 and such periphery; the clearance for viscose preferably being from about 0.010 to 0.035 inch.

The viscose was kept from gelling because of heat caused by mixing by circulating a continuous stream of cool water through the water jacket 14.

The peripheral shearing, internal shearing and spiral flow rapidly mix the viscose and liquid pigment dispersion into a homogeneous mixture before pigment agglomeration and gelation can occur. Throughput of the mixture is preferably from about .013 to 0.20 cubic feet per minute and the time of mixing is preferably from about 0.5 to about 5 minutes. The homogenized mixture is discharged from the periphery of each compartment 75 at the chamber compartment 59 into the discharge port 64 and thence to conduit 65 ready for use, such as in a continuous viscose regenerating process wherein the homogeneous mixture is continuously supplied to the viscose extrusion apparatus.

The details and manner of practicing the invention will become apparent from the following examples, it being understood that the examples are illustrative thereof and that the scope of the invention is not restricted thereto other than as set forth in the appended claims.

*Example I*

A homogeneous mixture of viscose and liquid pigment dispersion was prepared using the apparatus shown in FIGS. 1 through 4. The viscose was supplied to the mixer 10 under a pressure of about 85 p.s.i., had a viscosity of about 8000–18000 centipoises and a composition which essentially consisted of about 7 percent cellulose by weight of the viscose solution, about 6 percent caustic soda by weight and 87 percent water by weight. The liquid pigment dispersion was supplied to the mixer 10 under a pressure of 85 p.s.i. and essentially consisted of about 10 to 20 percent by weight of carbon black and about 80 to 90 percent by weight of water. The pumps 96 and 92 metered one part carbon black dispersion to 20 to 30 parts viscose, respectively. A clearance of about 0.017 inch was provided between the chamber compartment 57 and the shearing edges 77 of the rotated blades 76. The rotor 66 had four blades 76 spaced 90° apart, a diameter of about 3¼ inches and was preferably rotated at about 300 r.p.m. At this peripheral velocity and close clearance the edges 77 sheared the separately entering liquid streams into layers and quickly spread the sheared layers of viscose and carbon black dispersion into each other. Concurrent with the peripheral shearing and spreading action of the edges 77 the radial liquid streams flowed into the longitudinal sectorial compartment 75 as each compartment 75 passed the inlet ports 60 and 62. The rotation of the mixture induced spiral flow with such mixture being sheared as it passed through slots 78 in the blades 76 which slots were about 5/16 inch wide and about 1 inch long. Distance between slot centers was about ½ inch and the slot centers on one blade were offset ¼ inch from the slot centers on the succeeding blade. The mixture was also sheared by the blades 76 along the chamber periphery formed by the shell 12. Clearance therebetween was about .017 inch. The viscose was kept from gelling due to heat caused by mixing by circulating about 0.20 cubic feet per minute of water at a temperature of about 18° C. through the water jacket 14. The mixture of viscose and aqueous pigment dispersion was homogenized by the peripheral shearing, internal shearing and induced spiral flow in about one minute with about 0.11 cubic feet per minute of the homogenized mixture being discharged from the periphery of each compartment 75 at the chamber compartment 59 into the discharge port 64. The discharged mixture was free of pigment agglomerates and gelled viscose.

In general, it was found rotor speeds from about 300 to 1200 r.p.m. effectively caused homogenization of the viscose and carbon black dispersion of the foregoing example. At speeds below 250 r.p.m. the carbon black was insufficiently dispersed in the viscose causing pigment agglomeration. The throughput of the mixture can be increased by increasing the dimensions of the rotor and the chamber. However, even if the diameter of the rotor was increased to 6 to 10 inches, clearance between the blades 76 and the chamber 58, and the blades slot dimensions and spacing for homogenizing the viscose and carbon black dispersion are preferably as set forth in Example I. It was also found that to rotate a rotor having an 8 inch diameter at about the same speed as the 3¼ inch rotor and effectively homogenize the input liquids, it was desirable that the 8 inch rotor have about 8 blades.

Though the invention has been employed in mixing viscose and carbon black dispersion, the invention is not restricted thereto. The following example is illustrative of this fact.

*Example II*

A homogeneous mixture of sodium alginate solution and an aqueous vegetable dye solution was prepared using the apparatus shown in FIGS. 1–4 except the rotor 66 had 3 radial blades. The sodium alginate supplied to the mixer 10 under a pressure of about 85 p.s.i. had a viscosity of about 175,000–225,000 centipoises and a composition which essentially consisted of about 5.6 percent by weight of the sodium alginate and about 94.4 percent by weight of water. The pumps 96 and 92 metered about one part vegetable dye solution to about 50 parts sodium alginate. Clearance between the blades shearing edges 77 and the chamber inlet periphery was about .017 inch. The rotor had 3 blades spaced 120° apart, a diameter of about 3¼ inches, and was rotated from about 300–1200 r.p.m. The slots 78 in the blades 76 were about 5/8 inch wide and about 1 inch long. Distance between slot centers was about 13/16 inch and the slots centers on one blade were offset 13/32 inch from the slots centers on the succeeding blade. Clearance between the chamber periphery formed by the shell 12 and the blades 76 was .017 inch. 0.20 cubic feet per minute of water at a temperature of about 18° C. was circulated through the water jacket 14. The mixture was homogenized by the peripheral shearing, internal shearing and induced spiral flow as set forth in Example I. The time of mixing of the homogenized mixture was from about ½ to about 5 minutes with from about .007 to 0.10 cubic feet per minute of such mixture being discharged from the periphery of each compartment 75 at the chamber compartment.

Plastic materials are illustrative of other viscous liquid materials which may be homogenized with other liquid materials by the hereinbefore described apparatus.

Examples of coloring materials which can be mixed with viscous liquids other than the hereinbefore described carbon black dispersion are: pigment dispersions such as titanium oxide, zinc oxide, and others to form an opaque mixture; dyes to form clear colored mixtures; scintillating materials, such as mica to form a mixture having a metallic appearance; fluorescent materials, such as $\beta$-methyl umbelliferione, fluorescein and erythrosin to form mixtures which fluoresce under ultra-violet light; magnetic materials, such as iron and iron oxide powder to form mixtures that can be detected by electronic means; etc., and mixtures of any of the foregoing with each other.

It is also to be noted that the foregoing apparatus may be employed to prepare homogenized mixtures of two different viscous liquids, and in mixing more than two viscous liquids, such as by increasing the number of inlet ports; or by pre-mixing two of the viscous liquids.

Since it is obvious that various changes and modifications may be made in the described apparatus without departing from the nature and spirit thereof, it is to be understood that the invention is not limited thereto, except as set out in the appended claims.

What is claimed is:

1. A mixer for forming a homogeneous mixture from a plurality of liquid materials, comprising a cylindrical mixing chamber having longitudinally spaced and radially positioned inlet and outlet segments, means for supplying separate and individual streams of liquid materials to the inlet segment at spaced points about the inner periphery thereof, means for discharging the mixed materials from said outlet segment, a rotatable shaft extending longitudinally through said chamber, and a plurality of blades affixed to said shaft and continuously extending therealong and projecting radially therefrom with longitudinal sectorial compartments being formed between adjacent blades for receiving and rotating the incoming streams of liquids; each blade includes a shearing edge having a continuous shearing clearance with the inner periphery of the mixing chamber, said shearing edge being of greater length than the breadth of the inlet ports for extending across each inlet port and shearing the individual streams of liquids immediately upon entering the inlet segment of the mixing chamber into liquid layers and quickly spreading the sheared layers of liquids into each other, and slots through each blade which connect adjoining longitudinal sectorial compartments and shear and mix spiralling liquid mixture passing through said slots.

2. A mixer for forming a homogeneous mixture from a plurality of liquid materials, comprising a cylindrical mixing chamber, an inlet port for each stream of liquid material to be supplied to the mixer, each inlet port being radially positioned about the chamber and in substantially the same cross-sectional plane at one end of the chamber, a radially positioned outlet port at the opposite end of said chamber for discharging the mixed material, a rotable shaft extending longitudinally through said chamber, and a plurality of substantially flat blades affixed to said shaft which extend continuously therealong and project radially therefrom forming longitudinal sectorial compartments between adjacent blades which periodically open at opposite ends to inlet and outlet opening as said shaft is rotated; each blade includes continuous shearing means thereon that radially project substantially to the inner periphery of said chamber forming a shearing clearance therebetween and extend continuously along said chamber at least across each of said inlet ports for shearing the individual streams of liquids immediately upon entering the mixing chamber into liquid layers and quickly spreading the sheared layers of liquids into each other, and shearing slots in each blade for connecting adjoining longitudinal sectorial compartments and providing, in addition to the peripheral shearing of the blades, internal shearing of the spiralling mixture passing through said slots.

3. The mixer claimed in claim 2 in which the shearing means on each blade and the inner periphery of said chamber form a continuous shearing clearance therebetween for substantially the length of the chamber.

4. The mixer claimed in claim 3 in which the slots in each blade radially extend substantially the width of the blade.

References Cited in the file of this patent

UNITED STATES PATENTS

| | | |
|---|---|---|
| 50,963 | Shute | Nov. 14, 1865 |
| 1,969,162 | Smith | Aug. 7, 1934 |
| 2,559,516 | Russell | July 3, 1951 |
| 2,628,077 | Handwerk | Feb. 10, 1953 |
| 2,857,144 | Gurley et al. | Oct. 21, 1958 |
| 2,926,006 | Isreeli | Feb. 23, 1960 |

FOREIGN PATENTS

| | | |
|---|---|---|
| 486,375 | Great Britain | June 2, 1938 |